BRAKING APPARATUS

Filed Jan. 26, 1967 3 Sheets-Sheet 1

Inventor.
Lloyd Osborn.
By. Brown, Jackson, Boettcher & Dienner
Att'ys

Dec. 23, 1969 L. OSBORN 3,485,459

BRAKING APPARATUS

Filed Jan. 26, 1967 3 Sheets-Sheet 2

Inventor:
Lloyd Osborn
By Brown, Jackson, Boettcher & Diemer
Att'ys.

Dec. 23, 1969 L. OSBORN 3,485,459

BRAKING APPARATUS

Filed Jan. 26, 1967 3 Sheets-Sheet 3

Inventor:
Lloyd Osborn.
By Brown, Jackson,
Boettcher & Dienner Attys.

United States Patent Office 3,485,459
Patented Dec. 23, 1969

3,485,459
BRAKING APPARATUS

Lloyd Osborn, Stevensville, Mich., assignor to V-M Corporation, Benton Harbor, Mich., a corporation of Michigan Filed Jan. 26, 1967, Ser. No. 612,025
Int. Cl. G03b *1/04*
U.S. Cl. 242—210 15 Claims

ABSTRACT OF THE DISCLOSURE

Apparatus for braking the two reels of a tape transport mechanism which is suitable, for example, in a tape recording and playing machine wherein either reel may serve as the supply reel while the other serves as a take-up reel. The braking apparatus includes braking hubs and brake band means. The application of the brake band means to the rotating braking hubs effects a frictional braking force at the take-up reel which supplements the braking force applied to the supply reel.

Brief summary of the invention

Heretofore many tape recording and/or playing machines have had relatively slow tape speeds and, therefore, braking the reels of the tape transport mechanism has not been a difficult feat. It has not been uncommon to employ a braking surface to a braking hub of only one of the two rotating reels. However, depending upon the speed of rotation of the reels and the manner of application of the braking surface, it is possible to put excessive tension on the tape in slowing down the unbraked reel even when the tape's linear speed is not great.

Tape recording and/or playing machines are increasingly being designed for very much faster tape speeds and the full advantage of such machines is provided when they are capable of "instantaneous" stops and starts. Providing such rapid stops without, at the same time, subjecting the tape to excessive tension has not proven easy.

It is one object of my invention to overcome the danger of placing excessive tension on the tape during the braking operation, regardless of the speed of operation.

It is a further object of my invention to afford very rapid, and safe, stops for machines designed to have rapid tape speeds.

These objectives are provided by my invention by the application of braking force to both reels, but with the force on the two reels differing so that greater braking force is applied to whichever reel is serving as the supply reel. In this way no tape will be delivered by the supply reel which cannot be taken up by the take-up reel and no loose tape will exist between the reels as can be the case when the take-up reel is more strongly braked than the supply reel. Also by applying brakes to both reels much faster stops are possible and if the application of the brakes is done properly, as is possible by my invention, excessive tension will not be placed on the tape.

My improved brake apparatus provides an interconnection of the brake bands and their application to the braking hubs of the reels in such a manner that the braking action on the take-up reel increases the braking action on the supply reel. This action is afforded regardless of which direction the tape is moving, that is, regardless of which reel is serving as the supply reel.

I further provide a structure in which the differential in braking action on the two reels can be proportioned in different desired amounts.

The foregoing and other objectives and advantages of my invention will be apparent, or become so from the description which follows when considered in connection with the appended drawings.

Detailed description

Figure 1:
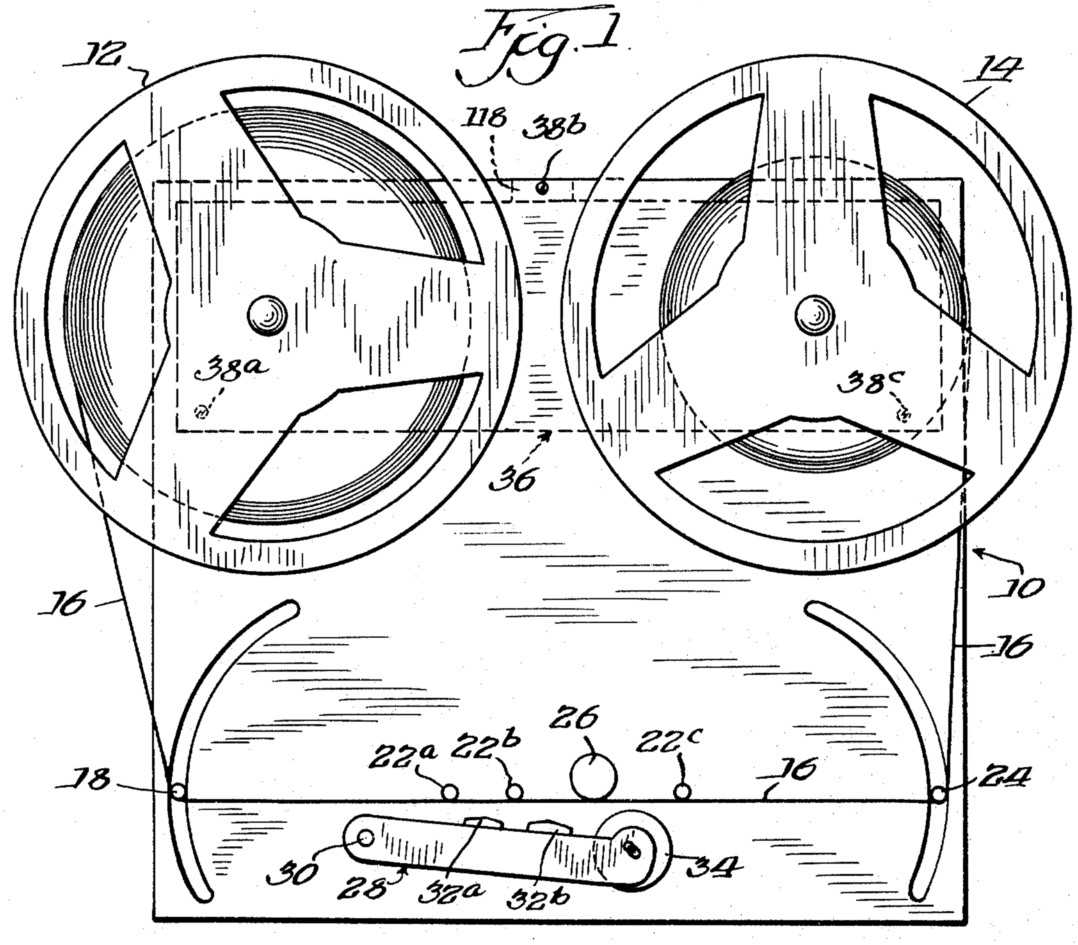
FIGURE 1 is a diagrammatic top plan view of a tape transport deck to show the general relation of the parts to the braking apparatus of my invention.

Referring first to FIGURE 1, a tape transport deck for a tape recording and playing machine is indicated generally by the numeral 10. Supported above the deck for rotation is a reel which will be designated as the supply reel 12. Another reel similarly supported is a take-up reel 14. These designations are chosen since they are the customary terms used for the reels in the "record" or "play" modes. It will be appreciated, however, that in the "rewind" mode, reel 14, the so-called "take-up" reel, will serve as the tape supply reel and at that time reel 12 will become a take-up reel.

The tape 16 is shown extending from supply reel 12, around a movable guide pin 18 carried on a tape tensioning device (not shown), then past a series of guides 22*a*, 22*b* and 22*c*, and past another movable guide pin 24 of another tensioning device to the take-up reel 14. Capstan 26 lies between guides 22*b* and 22*c*, and movable head bar 28, pivoted at 30, carries heads 32*a* and 32*b* and pressure roller 34. Shown in dotted lines, a sub-assembly 36 is supported from the deck 10 by screws 38*a*, 38*b* and 38*c* and lies beneath the deck.

Figure 2:
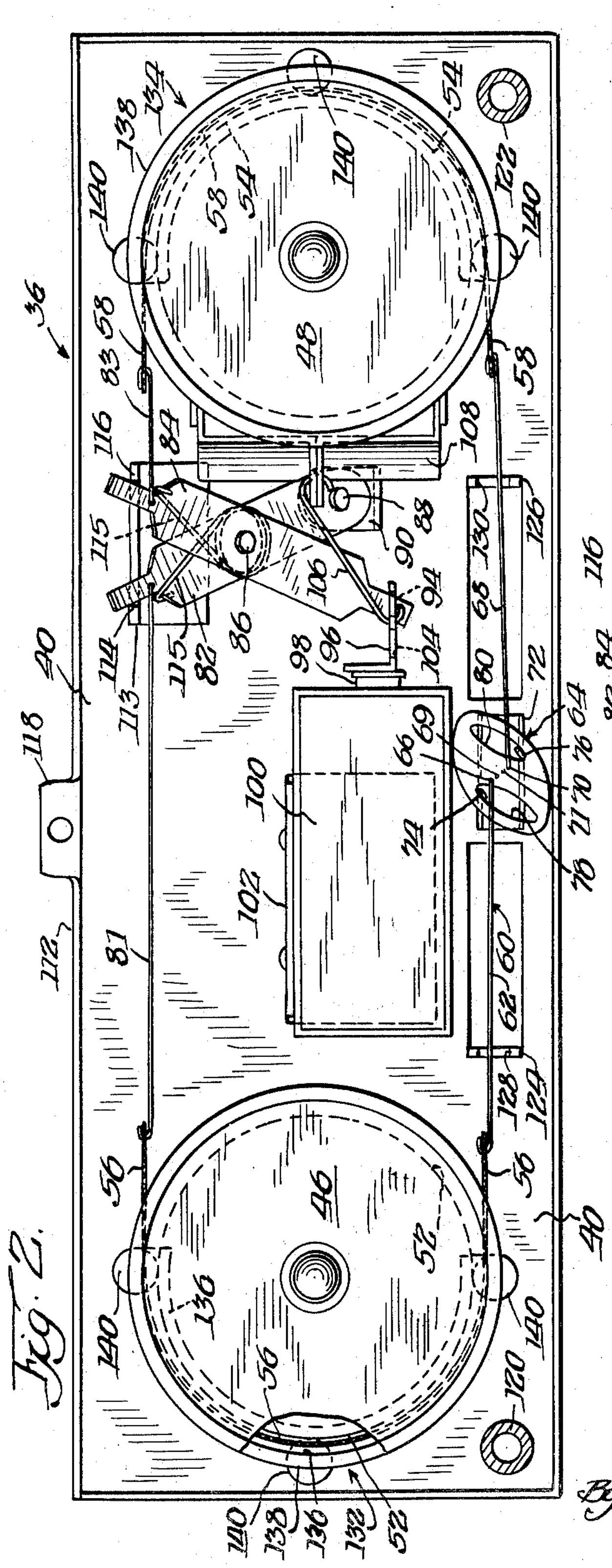
FIGURE 2 is a top plan view of an enlarged scale of the braking apparatus and associated structure, certain portions being broken away for a clearer disclosure and with the assembly separated from the deck of FIGURE 1.
Figure 3:
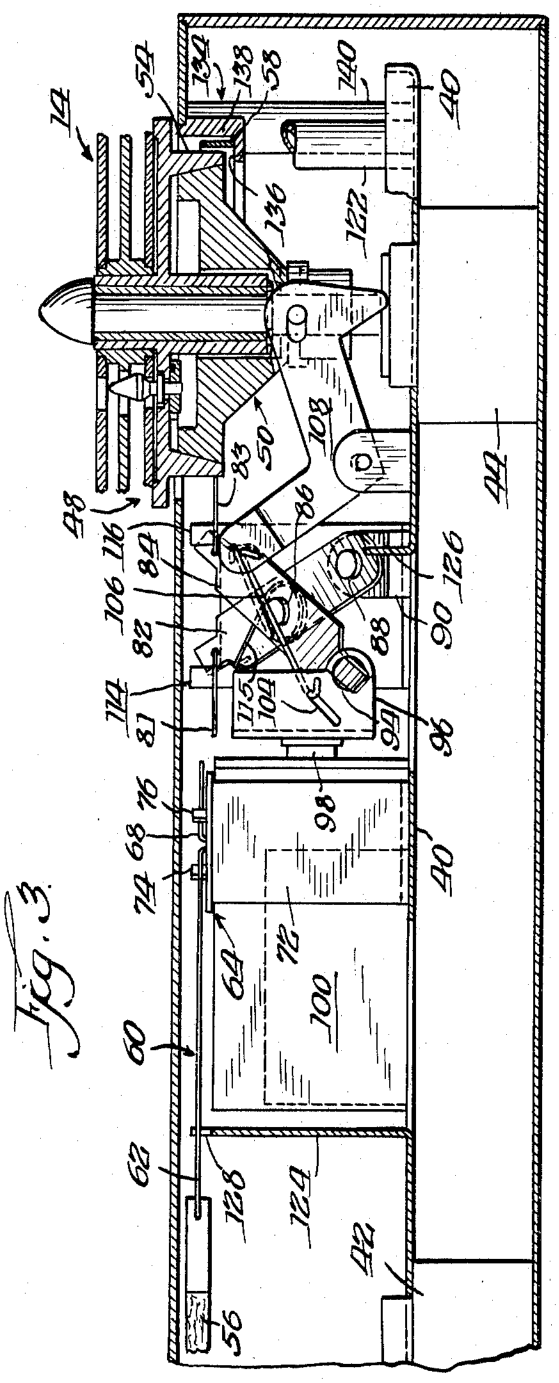
FIGURE 3 is a side elevation of the structure of FIGURE 2 with certain portions being shown in section and other portions being broken away.

Referring then to FIGURES 2 and 3, the subassembly 36 includes a sub-base 40 from which are supported the motors 42 and 44 for driving the reels 12 and 14, respectively. Motor 42 is directly coupled to drive a reel supporting member 46 while motor 44 is coupled to a reel support member 48 through a clutch mechanism, indicated by the reference numeral 50. For details of a reel supporting member such as member 48 see my Patent No. 3,367,596, issued Feb. 6, 1968. The reel supporting members 46 and 48 have braking hubs 52 and 54, respectively, and are adapted to be engaged by flexible brake bands 56 and 58, respectively, for braking the reel supporting members. Bands 56 and 58 are each interconnected by an end to each other by a linkage means indicated by the numeral 60. Linkage means 60 comprises a wire 62 connected to brake band 56 and to the force dividing link 64 at a pivotal aperture 66, and a wire 68 connected to brake band 58 and to the link 64 at a pivotal aperture 70. Alternate pivotal apertures 69 and 71, inwardly of pivotal apertures 66 and 70, are provided for connection with wires 62 and 68.

Link 64 rests on the upper edges of a U-shaped bracket 72 which is fastened to sub-base 40. The upper edges of bracket 72 have a pair of spaced apart upwardly extending tabs 74 and 76 set at an angle to the arms of bracket 72 and serving as fulcrums for link 64. Link 64 has a pair of spaced apart openings 78 and 80 through which the tabs 74 and 76 extend, respectively.

Opposite ends of the brake bands 56 and 58 are pivotally connected by links 81 and 83 with a pair of levers 82 and 84, respectively, at their one ends and the levers are pivotally interconnected by a pivot pin 86. The lower end of lever 82 is pivotally connected by a fixed pivot pin 88 to an angularly upturned tab 90 formed from sub-base 40 and the lower bent end of lever 84 is disposed in an opening 94 in an angle bracket 96 which is mounted on the armature 98 of a solenoid structure, indicated generally by the reference numeral 100. An alternate form of connection between the lower end of lever 84 and armature 98 is shown in the diagrammatic views of FIGURES 4, 5 and 6 wherein a link 99 directly connects lever 84 with the armature. Solenoid structure 100 is fixed to a flange 102 formed from the sub-base 40. A slot 104 in bracket 96 receives one end of a link 106 and the other end of link 106 is connected with operating mechanism, designated generally by the numeral 108, which operates the clutch mechanism 50. Such connection of operating mechanism 108 with the armature 98 permits the solenoid 100 to also control movement of the clutch in proper timed relation with the application and removal of the brakes.

Figure 4:
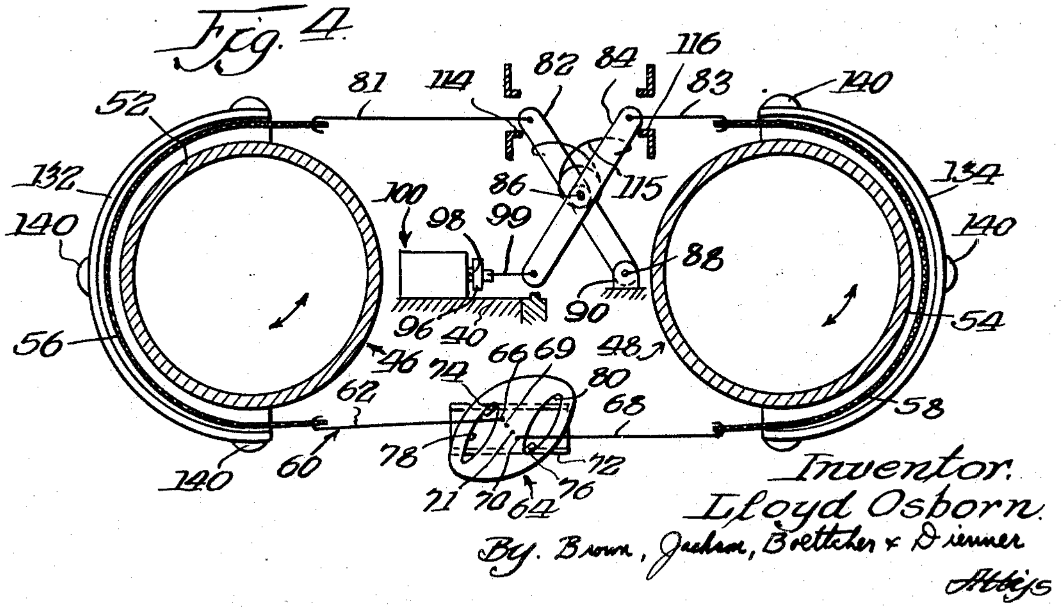
FIGURE 4 is a diagrammatic showing of the braking apparatus in its non-operating condition such as may exist when the reels are rotating.
Figure 5:
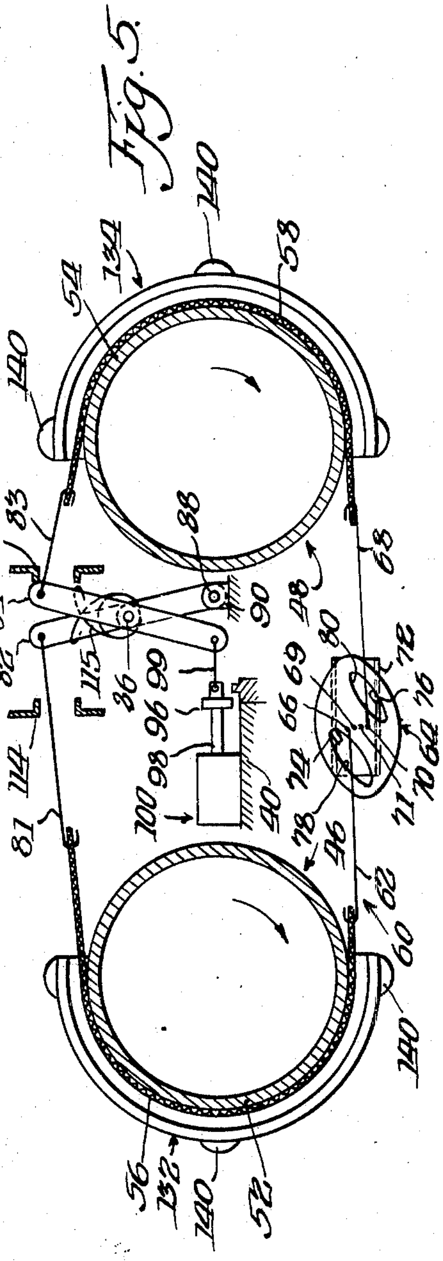
FIGURE 5 is a similar diagrammatic showing of the braking apparatus applied to the rewinding mode of the tape recorder.
Figure 6:
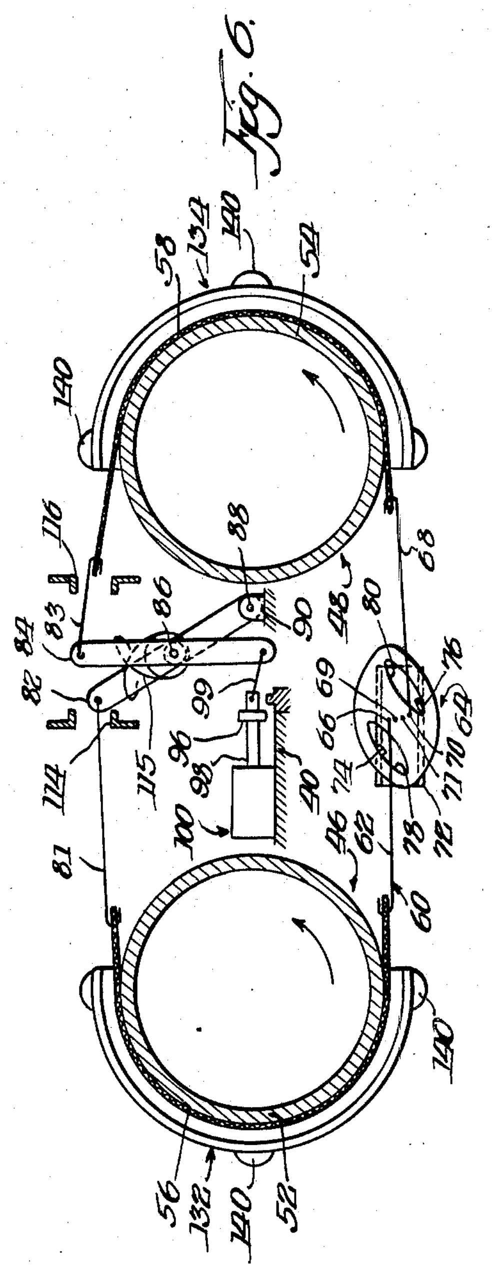
FIGURE 6 is a diagrammatic showing of the braking apparatus applied to a forward-wind mode of the tape recorder.

A spring 115 normally biases the levers 82 and 84 toward each other so as to cause the brake bands 56 and 58 to be drawn against the brake hubs 52 and 54. As is shown in FIGURES 4, 5 and 6 spring 115 encircles the pivot pin 86 and has its opposite ends bearing against the levers 82 and 84 to bias them toward each other. However, so long as solenoid 100 is energized so as to draw its armature 98 inwardly (to the left as viewed in FIGURES 2 through 6), said armature pulls the lower end of lever 84 to the left and causes the upper ends of levers 82 and 84 to separate thereby overcoming the braking action provided by the biasing spring 115. Along the upper margin of flange 113 a notch is provided whereby a pair of shoulders 114 and 116 is formed against which the outer bent ends of levers 82 and 84 can abut during application of the brake bands to the braking hubs in a manner which will be described below.

It will be seen that extending in opposite directions from the outer ends of the levers 82 and 84 there is a looped structure which includes the interconnected brake bands 58 and 56 and goes around the braking hubs 52 and 54. While this looped structure includes, in sequence, wire link 81, brake band 56, wire link 62, force dividing link 64, wire link 68, brake band 58, and wire link 83, it will be understood that a single continuous brake band could replace the above described components of the looped structure. Alternately a single brake band could extend from wire link 81 around the braking hubs to wire link 83. However, the looped structure with the various components first described above is preferred.

An outwardly turned tab 118 at the upper margin of flange 112 of sub-base 40 and upstanding posts 120 and 122 at corners of sub-base 40 are apertured and threaded to receive screws 38*a*, 38*b* and 38*c* so that the sub-assembly 36 can be secured beneath deck 10. Formed from the sub-base 40 and bent upwardly therefrom are two strap portions 124 and 126 which have guide notches 128 and 130, respectively, at their upper ends to guide wire links 62 and 68. The bases of the notches 128 and 130 can also serve as a rest for links 62 and 68 when the brake bands are in a position of rest. Partially encircling the braking hubs 52 and 54 are supporting structures 132 and 134, respectively. Each of these comprises a curved shelf 136 and an integrally formed curved wall 138 which are adapted to support and position the brake bands 56 and 58, when they are in their position of rest, so that they will be adjacent to the hubs and ready to be applied rapidly. A plurality of integral supporting legs 140 connects each supporting structure 132 and 134 with the sub-base 40.

In the operation of the braking apparatus of my invention, assume that the tape recorder is in the recording mode with motor 44 driving the reel supporting member 48 for take-up reel 14 with the clutch mechanism 50 engaged. At this time the solenoid 100 is energized and its armature 98 is retracted, i.e., moved to the left. Referring then to FIGURE 4, the diagrammatic showing illustrates the brakes in a position of rest, wherein the brake bands 56 and 58 are supported by the brake band supports 132 and 134 adjacent the braking hubs 52 and 54 but not in engagement with them. This position of the brake bands 52 and 54 results from the fact that armature 98 of the solenoid 100 has pulled the lever 84 by its lower end in a clockwise direction, thereby overcoming the force of the spring means 115 which tends to bias the levers 82 and 84 together. At this time, therefore, the loop structure which includes the brake bands 52 and 54 is as shown in FIGURE 4.

In the event that it is desired to assure that the brake bands 56 and 58 will be drawn away from the braking hubs 52 and 54 when the brakes are not applied, two supplemental retraction springs (not shown) may be used and connected to the brake bands and at their opposite ends to some fixed point, thereby tensioning the springs and urging the brake bands backwardly toward the curved walls 138 while resting on the supporting curved shelves 136 of the brake band supporting structure 132 and 134. Such springs are light and are easily overcome by the brake-applying-spring 115 of FIGURE 4 when the solenoid is deenergized. The linkage 60 interconnecting the brake bands 56 and 58 is in a neutral position.

If, at this time, the user of the machine stops the forward motion of the tape as by operation of the usual stop button associated with a tape recording machine, solenoid 100 will be deenergized and spring means 115 will function to immediately bias the brake actuating levers 82 and 84 toward each other. The lower end of lever 84 will pull the armature 98 to the right, as viewed in FIGURE 4, and brake bands 56 and 58 will be immediately drawn into engagement with the braking hubs 52 and 54 of the reel supporting members 46 and 48. Motor 44 which has been driving the take-up reel 14 will be disconnected from the reel supporting member 48 because the movement of armature 98 will actuate the operating mechanism 108 for the clutch mechanism 50 to disengage the clutch. As may be seen, movement of the bracket 96 to the right with the armature 98 will also cause the lowermost end of the slot 104 in bracket 96 to engage the end of link 106 to cause the operating mechanism 108 to move the clutch mechanism 50 to disengaged position.

As the brake bands 56 and 58 are applied to the braking hubs the rotation of the reel supporting member 48 and its reel will react with the brake band 58 to cause it to be shifted in a counterclockwise direction with the reel supporting member 48 and the reel 14. This will cause the brake operating levers 82 and 84 to be drawn counterclockwise around the pivot point 88 in a position against the stop 114 as illustrated in FIGURE 6. As a result the braking force applied by the brake spring 115 to hub 52 of reel 12 will be supplemented by a braking force applied by the braking friction of the brake band 58 with its braking hub 54, since the brake band 58 is connected with brake band 56 through the linkage 60. Consequently a greater braking force is applied to the supply reel 12 than to the take-up reel 14. This will assure that there will be no loose tape between the reels during the braking action or thereafter. Because both reels are braked, excessive tension in the tape is avoided. The total braking force applied to the two braking hubs is, of course, based upon the strength of the brake-actuating spring and the extent of surface engagement of the brake bands and braking hubs and the materials of which the hubs and brake bands are formed. I prefer to make the hubs and bands of the same respective materials and with the same areas of surface engagement and can then use the braking apparatus to perform in the same manner regardless of the direction of rotation of the two reels.

While it is not essential that the force dividing links 64 be employed, I can control and divide the braking force applied to the supply reel by means of link 64 which is a part of the linkage means 60 between brake bands 56 and 58. As may be seen from FIGURES 4 and 6 the link 64 shifts in position from its neutral position of FIGURE 4 to the operating position of FIGURE 6 during braking of the recording mode. Since the take-up reel 14 has been driven and is rotating in a counterclockwise direction at the time the brakes are applied, brake band 58 through its connecting wire link 68 pulls on the link 64 at the pivotal connection 70 and draws the link toward the right so that the end of link 64's enlarged aperture 80 will come into engagement with the tab 76, the edge of which tab will then serve as a fulcrum point for the link. By reason of link 62's pivotal connection with link 64 at greater distance from the fulcrum point than link 68's pivotal connection with link 64, it will be seen from FIGURE 6 that the wire link 62 drawn with lesser force toward the right by link 64 than it would be if link 62 were directly connected with the other wire link 68. This results in a reduction in the amount of braking force on the supply reel in the event it is found desirable in a particular structure to so reduce the force, while yet permitting it to exceed the braking force on the take-up reel 14. As may be seen from FIGURE 6 alternate apertures 69 and 71 are also provided for connection with the links 62 and 68 in the event a different degree of force is to be provided through link 64.

If the mode of operation of the tape recording machine is the rewind mode whereby the supply reel 12 becomes the take-up reel and the regular take-up reel 14 becomes the supply reel, the braking action will be the same, that is, the greater braking force will be applied to the reel which is supplying the tape than to the reel which is taking it up. FIGURE 5 illustrates the application of brakes during "rewind" and it will be observed that the brake operating levers 82 and 84 have been biased toward each other and they, and the brake bands, have been rotated in a clockwise direction which is the direction of rotation of reel 12. This rotational movement is limited by the stop shoulder 116, as shown. Division of the braking force on reel 14 (now serving as a supply reel) is provided by link 64 which, in this instance, has been drawn to the left, as viewed in FIGURE 5, so that the right end of its enlarged aperture 78 will engage the edge of tab 74 which then serves as a fulcrum point for link 64. Wire link 68, leading from brake band 58, has its pivotal connection 70 with link 64 at a greater distance from the fulcrum point than wire link 62's connection at 66 with link 64. Hence, link 68 will be drawn with less force toward the left than link 62 but still the total braking force on reel 14 will exceed that on reel 12.

While I have described a preferred embodiment of my invention, I do not intend to be limited to that embodiment, since various modifications coming within the scope of my invention will suggest themselves to one skilled in the art who has my disclosure before him.

I claim:

1. For use in a tape recorder or the like having a pair of tape supporting reels adapted in use to be rotated in the same direction at the same time, with each reel having a braking hub, the improvement comprising brake band means, and operating structure for applying said brake band means to said braking hubs when the reels are rotating with one reel serving as a take-up reel and the other as a supply reel, said brake band means for said hubs being interconnected and defining first and second end portions, said operating structure interconnecting said first and second end portions and including means limiting movement of the end portion closest to the supply reel, said operating structure further including means operatively associated with the other of said end portions to urge said other end portion in a direction to frictionally apply said brake band means against said braking hubs during rotation thereof such that application of said brake band means to said rotating hubs effects a frictional braking force at the take-up reel which supplements the braking force applied to the supply reel.

2. The improvement of claim 1 wherein the brake band means comprises a looped structure encircling the hubs, and wherein said means operatively associated with said other of said end portions comprises means for pulling on the other of said first and second end portions of said brake band means to engage the latter with said braking hubs.

3. The improvement of claim 2 wherein the brake band means comprises a pair of friction bands with each bearing on a respective braking hub and linkage means further interconnecting said friction bands between said braking hubs.

4. The improvement of claim 3 together with a support partially encircling each braking hub for supporting each respective friction band.

5. The improvement of claim 3 wherein the linkage means includes a force dividing mechanism.

6. For use in a tape recorder or the like having a pair of tape supporting reels adapted in use to be rotated in the same direction at the same time, with each reel having a braking hub, the improvement comprising brake band means, and operating structure for applying said brake band means to said braking hubs when the reels are rotating with one reel serving as a take-up reel and the other as a supply reel, said brake band means including a pair of friction bands forming a looped structure encircling the hubs with each band bearing on a hub and having one end connected with said operating structure and an opposite end connected to an end of the other band by linkage means, said linkage means including a force dividing mechanism comprising a pivotal link located in the linkage means between the friction bands and connected with them by torque arms which are adapted to be of different lengths when braking action takes place such that application of said brake band means to said rotating reels effects a frictional braking force at the take-up reel which supplements the braking force applied to the supply reel.

7. The improvement of claim 6 wherein the pivotal link has a pair of shiftable pivot points, the effective pivot point during brake application being determined by the direction of rotation of the reels.

8. The improvement of claim 7 wherein the shiftable pivot points are provided by a pair of spaced apart extended openings in the body of the link, and wherein the pivotal link's connections with the respective friction bands lie between said extended openings.

9. For use in a tape recorder or the like having a pair of tape supporting reels adapted in use to be rotated in the same direction at the same time, with each reel having a braking hub, the improvement comprising brake band means, and operating structure for applying said brake band means to said braking hubs when the reels are rotating with one reel serving as a take-up reel and the other as a supply reel, said brake band means comprising a looped structure encircling the hubs with the ends of the loop connected with said operating structure, said operating structure comprising a pair of levers which are pivotally connected intermediate their ends, each lever having one end connected to an end of the looped structure such that application of said brake band means to said rotating hubs establishes a friction braking force at the take-up reel which supplements the braking force applied to the supply reel.

10. The improvement of claim 9 wherein the operating means includes spring operating means for the levers and the levers are urged by the spring operating means in a direction to apply the brake band means to the braking hubs.

11. The improvement of claim 9 wherein one lever is pivotally connected by its other end to a fixed pivot and the other lever at its other end is actuatable by a solenoid, and wherein the operating means includes stop means limiting movement of said pair of levers in either direction about said fixed pivot.

12. The improvement of claim 11 wherein the operating means includes spring operating means for the levers and the levers are urged by the spring operating means in a direction to apply the brake band means to the braking hubs.

13. The improvement of claim 12 wherein during transportation of the tape between reels, the solenoid actuates said other lever in a direction overcoming the action of the spring operating means whereby braking action is prevented.

14. The improvement of claim 3 wherein the linkage means includes means for changing its effective length.

15. The improvement of claim 1 wherein said movement limiting means comprises stop means adapted to limit movement of said brake band end portion closest to the supply reel.

References Cited

UNITED STATES PATENTS

| | | | |
|---|---|---|---|
| 2,868,470 | 1/1959 | Selsted | 242—55.12 |
| 3,092,345 | 6/1963 | Clayton et al. | 242—55.12 |

FOREIGN PATENTS

| | | |
|---|---|---|
| 867,408 | 5/1961 | Great Britain. |

GEORGE F. MAUTZ, Primary Examiner